US007652987B2

(12) United States Patent
Qing et al.

(10) Patent No.: US 7,652,987 B2
(45) Date of Patent: Jan. 26, 2010

(54) METHOD AND SYSTEM FOR GUARANTEEING RELIABILITY OF END-TO-END QUALITY OF SERVICE

(75) Inventors: Wu Qing, Guangdong (CN); Yuepeng Chen, Guangdong (CN); Lingyuan Fan, Guangdong (CN); Dengchao Wu, Guangdong (CN); Ting Zou, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 417 days.

(21) Appl. No.: 11/637,978

(22) Filed: Dec. 13, 2006

(65) Prior Publication Data

US 2007/0159963 A1 Jul. 12, 2007

(51) Int. Cl.
*H04J 3/14* (2006.01)
(52) U.S. Cl. .................. 370/228; 370/216; 370/227; 370/389; 709/238; 709/239
(58) Field of Classification Search .......... 370/216, 370/225, 227, 228; 709/239, 238
See application file for complete search history.

(56) References Cited

U.S. PATENT DOCUMENTS

| 6,886,043 | B1* | 4/2005 | Mauger et al. ............. 709/238 |
| 2002/0060985 | A1 | 5/2002 | Lee et al. |
| 2002/0112072 | A1 | 8/2002 | Jain |
| 2002/0131424 | A1 | 9/2002 | Suemura |
| 2003/0053414 | A1* | 3/2003 | Akahane et al. ............ 370/216 |
| 2003/0110287 | A1* | 6/2003 | Mattson ..................... 709/238 |
| 2003/0147346 | A1 | 8/2003 | Kanakubo |
| 2004/0156310 | A1* | 8/2004 | Fredette et al. ............ 370/216 |

(Continued)

FOREIGN PATENT DOCUMENTS

EP 1111860 6/2001

(Continued)

OTHER PUBLICATIONS

Brunner, M., Quittek, J., "MPLS Management Using Policies", 2001, *IEEE/IFIP International Symposium on Integrated Network Management Proceedings, Integrated Network Management VII, Integrated Management Strategies for the New Millennium*, pp. 515-528.

(Continued)

*Primary Examiner*—Ricky Ngo
*Assistant Examiner*—Rasheed Gidado
(74) *Attorney, Agent, or Firm*—Ladas & Parry LLP

(57) ABSTRACT

The present invention discloses a method for guaranteeing reliability of end-to-end QoS, including: a. detecting and determining whether there is a failure on a Label Switched Path (LSP); if there isn't, returning to the process of detecting; otherwise, determining whether there is a backup LSP for the failed LSP; if there is, an edge router or a transmit router switching service streams and corresponding resources from the failed LSP to the backup LSP based on a certain policy; otherwise, a resource control function (RCF) entity allocating a new LSP according to network topologies for the service streams born on the failed LSP, and switching the service streams from the failed LSP to the newly allocated LSP, and releasing the path resources formerly occupied by the service streams. The method can guarantee service continuity and reliability of QoS in a bearer network.

18 Claims, 2 Drawing Sheets

U.S. PATENT DOCUMENTS

2005/0152269 A1* 7/2005 Liu ............................ 370/225

FOREIGN PATENT DOCUMENTS

| JP | 1-155285 A | 6/1989 |
| JP | 2002-271372 A | 9/2002 |
| JP | 2003-124978 | 4/2003 |
| JP | 2003-179631 A | 6/2003 |
| JP | 2003-224585 A | 8/2003 |
| JP | 2003-244202 A | 8/2003 |
| JP | 2003-297052 A | 10/2003 |
| JP | 2003-309595 A | 10/2003 |
| JP | 2004-080211 A | 3/2004 |
| JP | 2005-236489 A | 9/2005 |
| WO | WO 2005-122472 | 12/2005 |

OTHER PUBLICATIONS

Chadha, R., et al., "Policy Information Model for MPLS Traffic Engineering", Jul. 2000, *IETF Standard-Working-Draft, Internet Engineering Task Force*.

Pan, Ping, et al., "Fast Reroute Extensions to RSVP-TE for LSP Tunnels", Jan. 2002, *Network Working Group Internet Draft*. (retrieved from http://www.watersprings.org/pub/id/draft-ietf-mpls-rsvp-Isp-fastreroute-000.txt).

* cited by examiner

METHOD AND SYSTEM FOR GUARANTEEING RELIABILITY OF END-TO-END QUALITY OF SERVICE

FIELD OF THE INVENTION

The invention relates to technologies for guaranteeing Quality of Service (QoS), and especially, to a method and system for guaranteeing reliability of end-to-end QoS in a bearer network via hot switching on a Label Switched Path (LSP).

BACKGROUND OF THE INVENTION

Along with the continuous growth of the Internet, various network services appear, and advanced multimedia systems emerge in endlessly. Since real-time services are relatively sensitive to network characteristics such as transmission latency, delay jitter etc., when there are FTP services of high burstiness, or HTTP services with image files on the network, the real-time services may be greatly affected. Besides, since multimedia services may occupy much bandwidth, key services, which need to be guaranteed in the existing network, can not be reliably transmitted. Therefore, in order to guarantee reliable transmission of key services, various QoS technologies arise. The Internet Engineering Task Force (IETF) has proposed a good many service models and mechanisms to satisfy QoS requirement. At present, a scheme, which adopts an Integrated Service (INT-SERV) model on the access or edge area of a network, and adopts a Differentiated Service (DIFF-SERV) model on the core area of the network, is comparatively approved in the art.

In the Diff-serv model, a measure of setting priority levels is provided to guarantee the QoS. Although this model has a feature of high line efficiency, the real effectiveness is unpredictable. Therefore, an independent bearer control layer is introduced into the Diff-serv Model of the backbone network in the art, a special set of Diff-serv QoS signaling mechanisms are provided, and also a resource management layer is specially established for the Diff-serv network, which is used for managing topology resources of the network. This Diff-serv mode of resource management is called a Diff-serv model with an independent bearer control layer. FIG. 1 is a schematic diagram of the model. The 101 is a service server, such as a Call Agent (CA), which belongs to the service control layer for implementing functions such as soft switch. The 102 is a bearer network resource manager which belongs to the bearer control layer. Solid circles, such as the 103, are Edge Routers (ER); hollow circles, such as the 104, are Core Routers (CR), and circles filled with skew lines, such as the 105, are Boundary Routers (BR). Here, the ERs, CRs and BRs all belong to the bearer network, so they can be generally called as Connection Node (CN), and the CRs and BRs together can be called as Transmit Router (TR). In FIG. 1, every dot line ellipse in the bearer network represents a management domain, which is managed by a bearer network resource manager, and each domain includes a BR or an ER, and several CRs.

In the model of FIG. 1, the bearer network resource manager is in charge of configuring managing policies and network topologies, allocating resources for service bandwidth applications of users. The users' service bandwidth application requests and results, and path information of the service applications allocated by bearer network resource managers are transferred among the bearer network resource managers of management domains by signaling. When processing a user's service bandwidth application, the bearer control layer may define a route for the user's service, and the bearer network resource manager may inform the ER to forward the service stream according to the defined route.

Here, the route stored in a bearer network resource manager includes: a signaling route and a service route. The signaling route refers to a procedure how a bearer network resource manager looks for a next hop bearer network resource manager, and the service route, including an intra-domain route and an inter-domain route, refers to a procedure how a bearer network resource manager looks for an appropriate bearer LSP according to information of the service stream.

Usually, users' service streams are forwarded on the bearer network according to paths designated by the bearer control layer. Presently, a Multi-protocol Label Switching (MPLS) technology is employed in the art to establish a LSP via resource reservation according to the path of service stream designated by the bearer control layer; or a Resource Reservation Protocol-Traffic Engineering (RSVP-TE) protocol, or an explicit routing mechanism such as Constraint Routing-Label Distribution Protocol (CR-LDP) is employed to establish an end-to-end LSP.

In a bearer network, reliability guarantee is very important. At present, there is a good deal of methods to guarantee reliability in a bearer network, and the simplest one is cold backup, which means using one network entity as a complete backup of another network entity. For example, entity B is taken as a cold backup for entity A. When entity A fails, the backup entity B will totally substitute for entity A. Of course, both bearer connections and service connections of former entity A should be rebuilt in this case.

The cold backup method is easy to implement at the initial stage of network construction, when switching and smoothing are not needed in real time by nodes. However, this method is only suitable for a small-size network, because the small-size network has following characteristics: small traffic volume, relatively low real-time requirement, allowable to interrupt and rebuild connections, and unnecessary for LSPs to perform hot switching.

The inventor found: in a network with an independent bearer control layer, when LSPs are used as paths for bearing service streams, it lacks effective protection for the LSPs at the present technical scheme. In this case, when a failure appears on an LSP, service streams born on the LSP will be interrupted, which may give an undesirable impact on users' service experience.

SUMMARY

The invention provides a method for guaranteeing reliability of end-to-end QoS, in order to guarantee service continuity and QoS reliability in a bearer network.

The technical scheme of this invention is implemented as follows:

A method for guaranteeing reliability of end-to-end Quality of Service (QoS), including:

detecting and determining whether there is a failure on a Label Switched Path (LSP); if there isn't, returning to the process of detecting;

otherwise, determining whether there is a backup LSP for the failed LSP; if there is, an edge router or a transmit router switching service streams and corresponding resources from the failed LSP to the backup LSP based on a certain policy; otherwise, a resource control function (RCF) entity allocating a new LSP according to network topologies for the service streams born on the failed LSP, and switching the service streams from the failed LSP to the new LSP, and releasing path resources formerly occupied by the service streams.

Some embodiments of the invention provide a method that could guarantee reliability of end-to-end QoS. In this method, when a failure happens, the failed LSP may perform in part hot switching to guarantee continuity of service streams. Thus, the service streams born on the failed LSP may not be interrupted, and users' experience may not be affected. Moreover, reliability of end-to-end QoS framework may be greatly enhanced. For different conditions of services, QoS requirement of users can be satisfied according to specific environments of the network. Generally speaking, the method is simple, easy to be maintained and managed, and without limitation for network structure, so it is suitable for networks of almost any scope.

EMBODIMENTS OF THE INVENTION

The procedure of an embodiment of the invention is: for a network with an independent bearer control layer, a scheme is proposed when a failure happens on an LSP of a bearer layer, which does not interrupt transmission of service streams born on this LSP. That is, when a router device has detected a failure on an LSP, all service streams on the LSP are immediately re-routed. Specifically, the procedure is done as follows: checking whether the failed LSP has a backup LSP; if it has, reliably switching the service streams from the failed LSP to the backup LSP; and if the failed LSP does not have any backup LSP, a resource control function entity rapidly allocating a new LSP for the service streams born on the failed LSP, and releasing the original selected path resources.

Here, the resource control function entity can be a bearer control layer entity, or a bearer network resource manager. The router device can be an Edge Router (ER) or a Transmit Router (TR) that may support Multi-protocol Label Switching (MPLS) Operations and Management (OAM) mechanisms, at least support detection mechanisms based on LSPs, e.g., MPLS KSP fast fault detection and protection switch mechanism, which is consistent with the ITU-T Y.1771 and Y.1720 protocols.

Figure 1:
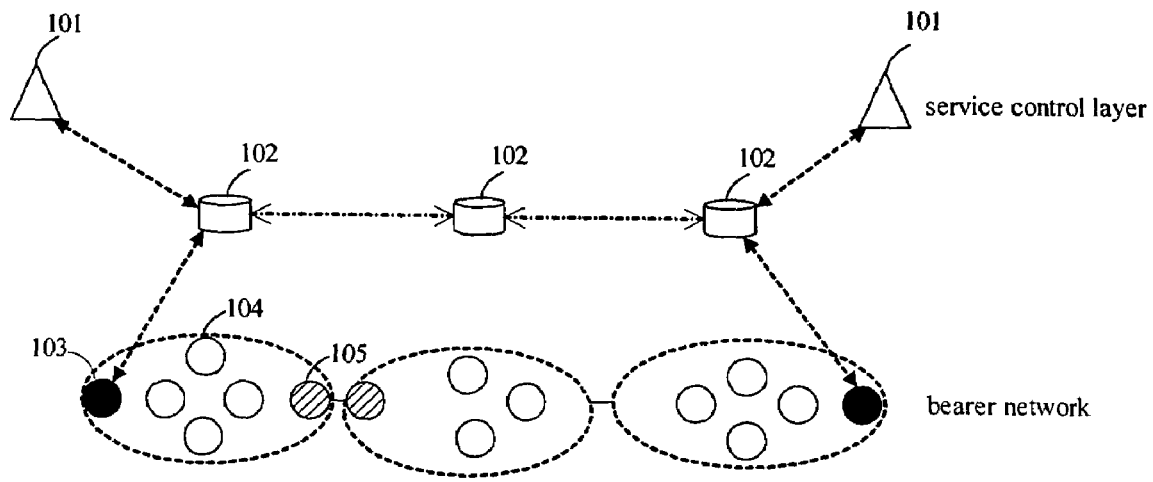
FIG. 1 is a schematic diagram of a network model with an independent bearer control layer in prior art.
Figure 2:
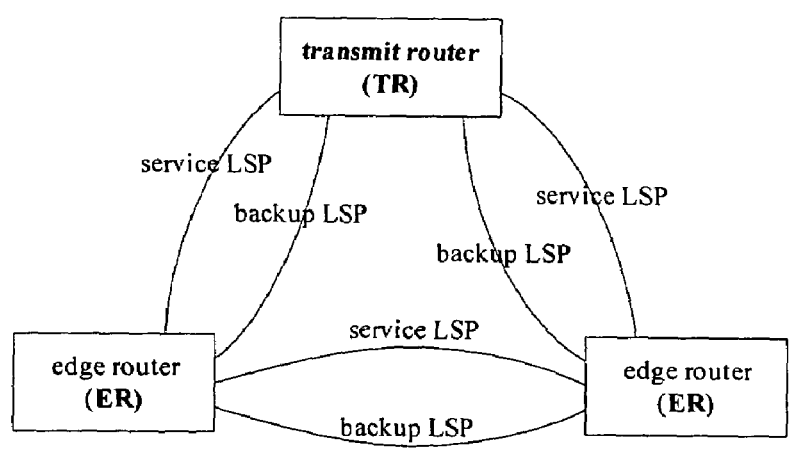
FIG. 2 is a schematic diagram for establishing backup relations among LSPs according to an embodiment of the present invention.

The failed LSP may have one or more backup LSPs, which can be established by static configuration, or via label switched signaling, such as CR-LDP, RSVP-TE etc. The procedure to establish a backup LSP between edge routers, or between an edge router and a transmit router is as shown in FIG. 2. Here, the LSP currently bearing service streams is referred to as a service LSP, and the LSP set for the service LSP as an alternate LSP is referred to as a backup LSP. The backup relations of all LSPs are recorded in a resource control function (RCF) entity. Generally, a backup LSP database is established in the RCF either through static configuration or dynamic gathering, and a resource available status of each backup LSP is stored in the backup database. The resource available status includes a current state of an LSP, such as normal or in failure, and also includes conditions of service streams born on the LSP and a current state of each service stream etc.

As to two or more LSPs that are set as backup LSPs mutually, in a normal working state, the LSPs can serve as backup LSPs for one another, or independently bear different service streams to obtain load balance on the network. When one of the LSPs of a mutual backup pair is in failure, the service streams born on the failed LSP will be immediately switched to its backup LSP, with the service streams of the backup LSP delivered on the backup LSP itself simultaneously.

When performing route reselecting, it is required to find an equivalent route for the original route as possible within the same management domain. As to the fast reroute, it can apply, but not limited to, a routing matrix table to calculate an equivalent path for the service streams, where the routing matrix table includes parameters of service type, resources available, policies and specific QoS requirements etc. Thus, the route can be recalculated and exchanged in time based on corresponding parameters.

Figure 3:
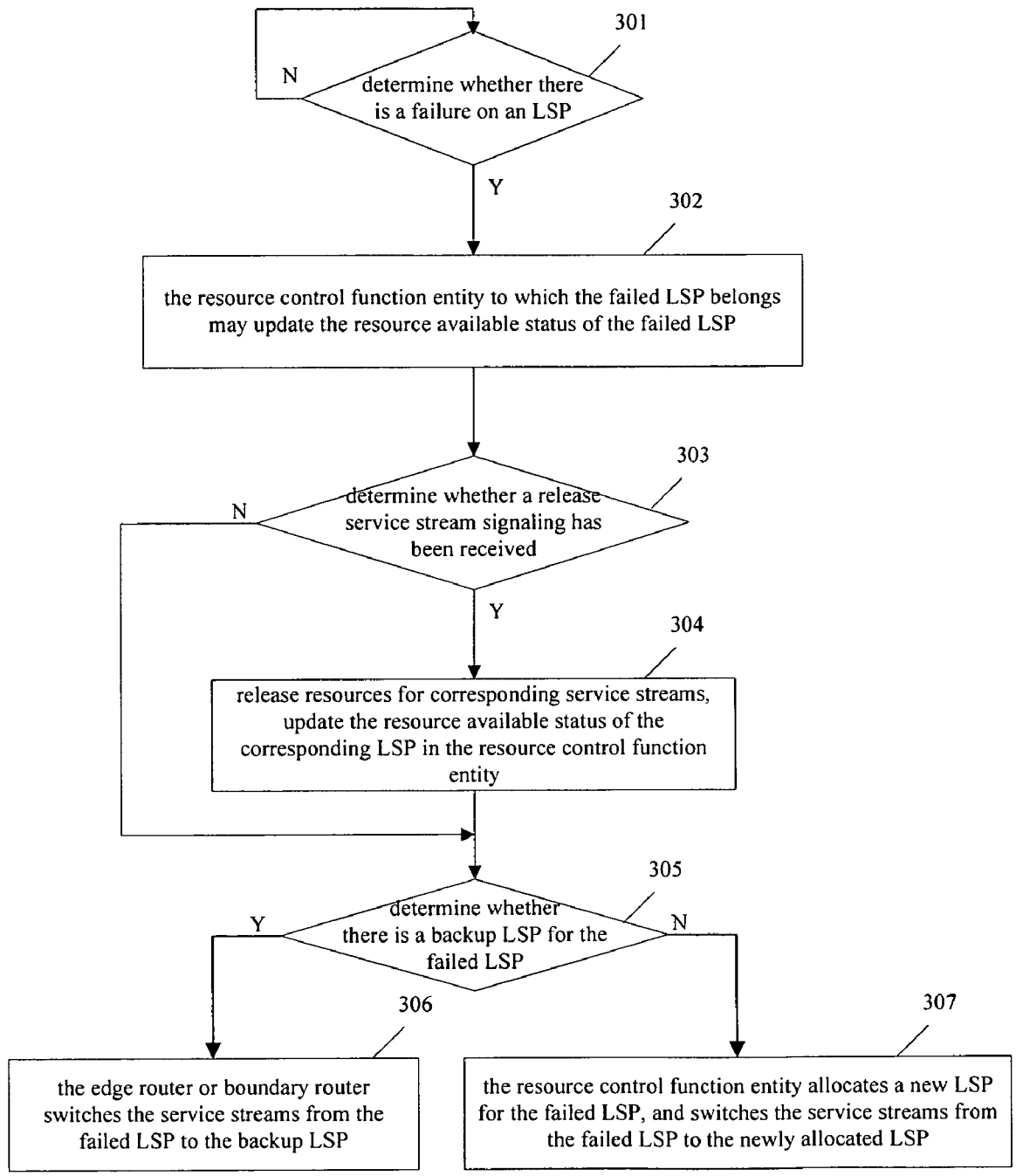
FIG. 3 is a flowchart for implementing the method for guaranteeing reliability of end-to-end QoS according to an embodiment of the present invention.

FIG. 3 shows a procedure of the method of an embodiment, which includes the following steps:

Steps 301~302: Detect and determine whether there is a failure on an LSP; if there isn't, return to Step 301; if there is, execute Step 303. When there is a failed LSP, the resource control function entity to which the failed LSP belongs may update the resource available status of the failed LSP in advance, and then execute Step 303.

Having recovered from the failure, the failed LSP may automatically turn into a backup LSP for the LSP now responsible for transferring the service streams. At the same time, the resource control function entity may update the resource available status of this LSP.

In this step, there are two methods to perform the process: the first case is detecting and reporting by an edge router or a boundary router whether there is a failure on an LSP passing through the edge router or boundary router itself; a second case is detecting by a resource control function entity whether a certain LSP fails. For the first case, the edge router or boundary router detects in real time whether there is a failure on any of the LSPs passing through itself based on a supported LSP detecting mechanism. If a failure happens on an LSP, the edge router or boundary router reports information of the failed LSP to the resource control function entity to which the failed LSP belongs. Having received the reported information, the resource control function entity updates the resource available status of the failed LSP in its database. For the second case, the resource control function entity detects whether there is a failure on any of the LSPs it manages. If there is a failed LSP, the resource control function entity may update the resource available status of the failed LSP in its database.

Steps 303~304: Determine whether a release service stream signaling for the service streams on the failed LSP has been received from a service control function (SCF) entity; if it has been received, release resources for corresponding service streams in the resource control function entity and the edge router or boundary router, update the resource available status of the corresponding LSP in the resource control function entity, and then go to Step 305; if it has not been received, directly execute Step 305. That is to say, service streams being released need not switch to the new LSP.

Step 305: Determine whether there is a backup LSP for the failed LSP; if there is, the edge router or transmit router rapidly switches the service streams and corresponding resources on the failed LSP to a certain backup LSP based on certain policies, and the backup LSP becomes the new LSP of the service streams; if there isn't, the RCF allocates a new LSP for the service streams born on the failed LSP based on the network topologies, switches the service streams on the failed LSP to the new LSP, and releases the path resources occupied by the switched service streams. That is, the RCF may designate a certain LSP as a backup LSP in real time. Having finished the switching, the RCF may update the self-stored resource available status for the corresponding LSP.

Here, the certain policies are sent from the RCF to the edge router or transmit router in real time, and stored in the edge router or transmit router. The policy includes: a 5-tuple of service stream (including a source address, a destination address, a source port, a destination port and a protocol type), and a service path label stack of service stream.

Since each service stream has a service path label stack, which is responsible for storing label values of all LSPs the service stream passes through, when any LSP is in failure, the service streams can be transferred on a new LSP naturally, as long as the label value of the failed LSP is replaced by that of an available LSP in the service path label stack, or a label value of a service LSP newly selected is exchanged with that of the failed LSP in a router device through a control command. Here, the control command is sent from the resource control function entity or an application layer of any other entity, such as the router device itself, that has detected the failure, where the router device refers to an edge router or a transmit router.

In this case, the above procedure further includes: the resource control function entity updating service path label stacks of each service stream born on the failed LSP, that is, using the label value of a selected backup LSP or a newly configured LSP for the failed LSP to substitute the label value of the failed LSP in the service path label stack; then, the RCF sending the updated service path label stack of the service stream containing corresponding information of the new LSP downward to the edge router or boundary router under protocols, in order to establish a new service data stream path and switch the service streams rapidly from the failed LSP to the backup LSP; later, the edge router or boundary router directly switching the service streams born on the failed LSP to the backup LSP according to the policies. Certainly, the method of converting the backup LSP to the new LSP may have other ways, except updating the service path label stack via exchanging label values between the new LSP and the failed LSP.

Here, when a new LSP is configured by the RCF, the interface protocol adopted between the RCF and the ER or TR may be, but not limited to, the common open policy service (COPS) protocol. The RCF may, but not limited to, use a routing matrix table to calculate and store an equivalent path for the service streams of the failed LSP, and the parameters of the routing matrix table may include, but not limited to, information such as service type, resources available, policies and specific QoS requirements and etc. Thus, according to the corresponding parameters, the path can be recalculated and instantly switched.

In practice, Steps 303 and 304 may be omitted, as well. That is, directly switch all the service streams from the failed LSP to the backup LSP without considering whether the service streams need to be released. Also, Steps 303 and 304 can be executed after Steps 305~307, that is, first switch the service streams to be released together with other service streams on the failed LSP to the backup LSP, and then release the corresponding service streams.

The method according to another embodiment of the present invention further includes: determining whether the failed LSP is connected with LSPs belonging to other management domains; if it is, the RCF of the failed LSP informs the LSP information of a new service through a bearer connection control signaling to the RCF of the peer end management domain to which the LSP connecting with the failed LSP belongs, and obtains an acknowledgment from the peer end RCF. Interaction can be implemented between these two RCFs by existing interaction protocols and procedures.

What is mentioned above is only embodiments of this invention, and it is not to limit the protection scope of the invention.

The invention claimed is:

1. A method for guaranteeing reliability of end-to-end Quality of Service (QoS) in a network with an independent bearer control layer, comprising:

detecting and determining whether there is a failure on a Label Switched Path (LSP); if there isn't, returning to the process of detecting;

if there is a failure on the LSP, determining whether there is a backup LSP for the failed LSP;

if there is a backup LSP, sending, by a resource control function (RCF) entity, being a bearer control layer entity, information of the backup LSP to an edge router or a transmit router located on a bearer layer, and switching, by the edge router or the transmit router, service streams and corresponding resources from the failed LSP to the backup LSP based on a certain policy;

if there isn't a backup LSP, the RCF entity allocating a new LSP for the service streams born on the failed LSP according to network topologies, and switching the service streams from the failed LSP to the new LSP, and releasing path resources formerly occupied by the service streams.

2. The method according to claim 1, wherein detecting and determining whether there is a failure on an LSP comprises: detecting and determining whether there is a failure on an LSP in a management domain;

the process of sending by a resource control function (RCF) entity information of the backup LSP to an edge router or a transmit router located on a bearer layer comprises: sending, by a RCF entity of the management domain, information of the backup LSP to an edge router or a boundary router of the management domain;

the process of the RCF entity allocating a new LSP for the service streams comprises: the RCF entity allocating a new LSP in the same management domain for the service streams.

3. The method according to claim 2, wherein the process of detecting comprises: detecting, by an edge router or a boundary router, whether there is a failure on the LSPs passing through the edge router or boundary router; if there is, reporting, by the edge router or boundary router, information of the failed LSP to the RCF entity the failed LSP belongs to; and updating, by the RCF entity, the resource available status of the failed LSP based on the reported information.

4. The method according to claim 2, wherein the process of detecting comprises: checking, by the RCF entity, all the managed LSPs, and when determining there is an LSP in failure, updating, by the RCF entity, the resource available status of the failed LSP based on the check result.

5. The method according to claim 2, further comprising: determining whether a release service stream command sent from a service control function entity, for releasing the service streams born on the failed LSP, has been received; if it has, the RCF entity and the edge router or boundary router releasing resources of the service streams born on the failed LSP, and updating the resource available status in the RCF entity for the failed LSP; otherwise, not performing the release operation.

6. The method according to claim 2, further comprising: deciding whether the failed LSP is connected with other LSPs the management domain of which is different from that of the failed LSP; if it is, via a bearer connection control signaling, notifying, by the RCF entity of the failed LSP, information of the new LSP to a RCF entity of an peer end management domain the other LSP belongs to, and getting an acknowledgement from the RCF entity of the peer end management domain.

7. The method according to claim 2, wherein the certain policy comprises: a 5-tuple of service stream and a service path label stack of service stream.

8. The method according to claim 7, further comprising: updating, by the RCF entity, the service path label stack corresponding to each service stream born on the failed LSP, and sending all the updated service path label stacks of service streams born on the failed LSP downward to the edge router or boundary router; or adopting a router device to update service path label stacks for every service stream born on the failed LSP according to a control command.

9. The method according to claim 8, wherein the process of updating comprises: replacing the original label value of the failed LSP with the label value of the backup LSP or new LSP selected for the failed LSP.

10. The method according to claim 2, wherein the process of a RCF entity allocating a new LSP comprises: the RCF entity applying the Common Open Policy Service (COPS) interface protocol to communicate with the edge router or boundary router.

11. The method according to claim 2, wherein the process of a RCF entity allocating a new LSP comprises: the RCF entity adopting a router matrix table for the service streams born on the failed LSP to calculate an equivalent path in the same management domain.

12. The method according to claim 2, further comprising: presetting one or more backup LSPs for an LSP, storing the backup relations in the RCF entity of the LSP.

13. The method according to claim 2, further comprising: when a failure on an LSP has been determined, updating, by the RCF entity to which the failed LSP belongs, the resource available status of the failed LSP.

14. A system for guaranteeing reliability of end-to-end Quality of Service (QoS) in a network with an independent bearer control layer, comprising:
a detecting unit, configured to determine whether there is a failure on a Label Switched Path (LSP), and determine whether there is a backup LSP for the failed LSP;
a resource control function (RCF) entity, being a bearer control layer entity, configured to send, when the failed LSP has a backup LSP, information of the backup LSP to an edge router or a transmit router located on a bearer layer; allocate, when the failed LSP hasn't a backup LSP, a new LSP for the service streams born on the failed LSP according to network topologies, switch the service streams from the failed LSP to the new LSP, and release path resources formerly occupied by the service streams; and
the edge router or the transmit router, configured to switch service streams and corresponding resources from the failed LSP to the backup LSP based on a certain policy.

15. The system according to claim 14, wherein
the detecting unit is configured to determine whether there is a failure on an LSP in a management domain;
the RCF entity of the management domain is configured to send information of the backup LSP to an edge router or a boundary router of the management domain when the failed LSP has a backup LSP; allocate a new LSP in the same management domain for the service streams born on the failed LSP when the failed LSP hasn't a backup LSP.

16. The system according to claim 15, wherein the detecting unit is an edge router or a boundary router;
the edge router or boundary router is further configured to report information of the failed LSP to the RCF entity the failed LSP belongs to; and
the RCF entity is further configured to update the resource available status of the failed LSP based on the reported information.

17. The system according to claim 16, wherein the detecting unit is a RCF; and
the RCF entity is further configured to update the resource available status of the failed LSP when determining there is an LSP in failure.

18. The system according to claim 15, wherein
the RCF entity is further configured to decide whether the failed LSP is connected with other LSPs the management domain of which is different from that of the failed LSP; if it is, notifying, by the RCF entity of the failed LSP via a bearer connection control signaling, information of the backup LSP or the new LSP to an RCF entity of a peer end management domain the other LSP belongs to, and get an acknowledgement from the RCF entity of the peer end management domain.

* * * * *